May 10, 1955
L. B. BLACKSTONE
2,708,087
CENTERPOISE TRANSFORMER RACK
Filed Oct. 19, 1951
3 Sheets-Sheet 1
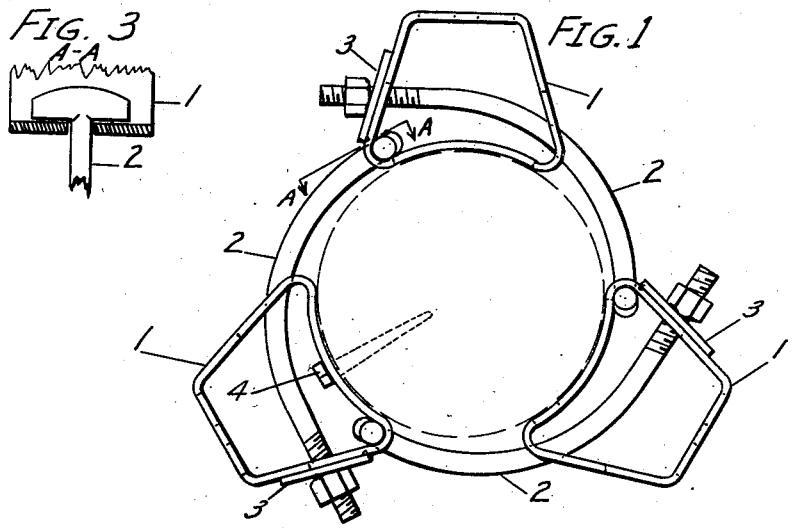
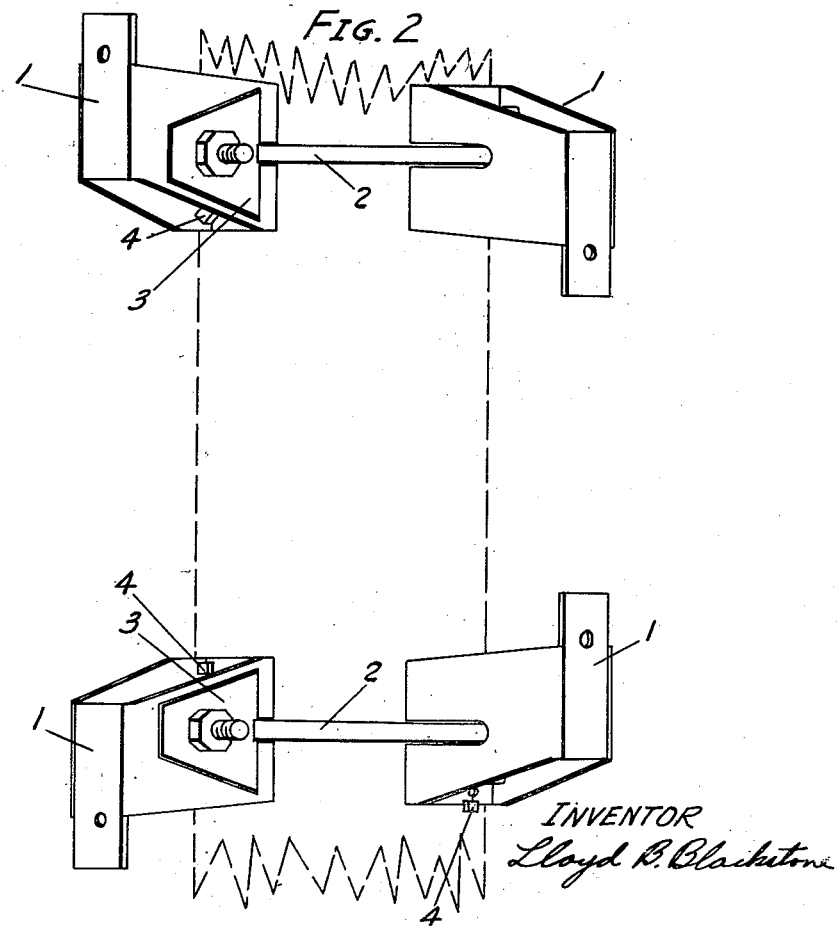
INVENTOR
Lloyd B. Blackstone May 10, 1955  L. B. BLACKSTONE  2,708,087
CENTERPOISE TRANSFORMER RACK
Filed Oct. 19, 1951  3 Sheets-Sheet 2

INVENTOR
Lloyd B. Blackstone

May 10, 1955  L. B. BLACKSTONE  2,708,087
CENTERPOISE TRANSFORMER RACK
Filed Oct. 19, 1951  3 Sheets-Sheet 3

INVENTOR
Lloyd B. Blackstone

United States Patent Office 2,708,087
Patented May 10, 1955

2,708,087

CENTERPOISE TRANSFORMER RACK

Lloyd B. Blackstone, Houston, Tex.

Application October 19, 1951, Serial No. 252,064

1 Claim. (Cl. 248—221)

The invention relates to a transformer rack for mounting two or three single phase distribution transformers on a single pole. The centerpoise transformer rack as shown in top view Fig. 1 and side view Fig. 2 is composed of six centerpoise bracket assemblies, each assembly being composed of a unique, reversible, offset bracket 1, a curved T bolt with nut 2, and a triangular washer 3 so assembled that the T bolt secured by its head (Fig. 3) in one bracket passes through slots in the next bracket then through the triangular washer covering the outside slot; the washer forming a reinforced surface against which the rounded side of the T bolt nut can be tightened; three centerpoise bracket assemblies passing completely around the pole making a rigid, substantial and adjustable support for the top direct pole mounting brackets of the transformers and a similar combination of brackets properly spaced forming supports for the bottom, direct pole mounting brackets of the transformers.

Figure 4:
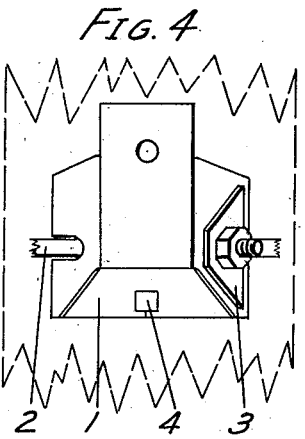
Figure 5:
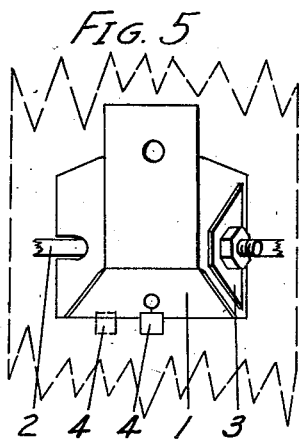

The centerpoise bracket is designated as a fixed bracket shown in Fig. 4 where the bracket is fixed in place on the pole by a lag screw 4 driven through the hole in the back of the bracket. A bracket is designated as a floating bracket shown in Fig. 5 where the bracket is supported on top of the lag screw 4 or screws allowing it to be adjusted about the pole by loosening and tightening the curved T bolts which bind it to the pole.

Figure 6:
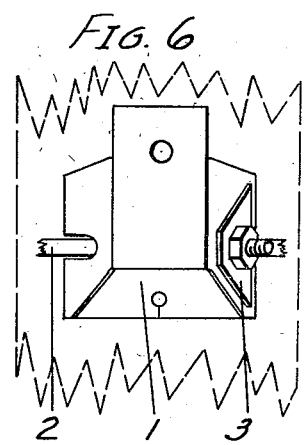

A bracket is designated as a suspended bracket shown in Fig. 6 where it is not supported on lag screws at all but depends entirely on the curved T bolts binding it against the pole for its support. Suspended brackets are also adjustable about the pole.

The terms upright bracket and inverted bracket are also used to denote the offset in the bracket. Thus with the top fixed bracket in an upright position, the bottom fixed bracket in an inverted position and the T bolts spaced 18 inches apart the brackets could be used to support a large transformer (25 kva. and larger E. E. I.–NEMA standard support lugs), while the adjacent transformer in the bank could be a small transformer if the bottom bracket is in an upright floating position and the top bracket is in an inverted suspended position as are the brackets on the right hand side of Fig. 2. The broken portion of the pole is shown in dashed lines.

To balance the weight of three equal sized transformers on a pole it is only necessary to measure the circumference of the pole under the brackets and locate each bracket ⅓ circumference of the pole from the other brackets. A slightly indented line on each bracket directly under the lag screw hole will aid in the exact centering of each bracket at its proper location.

Figure 12:
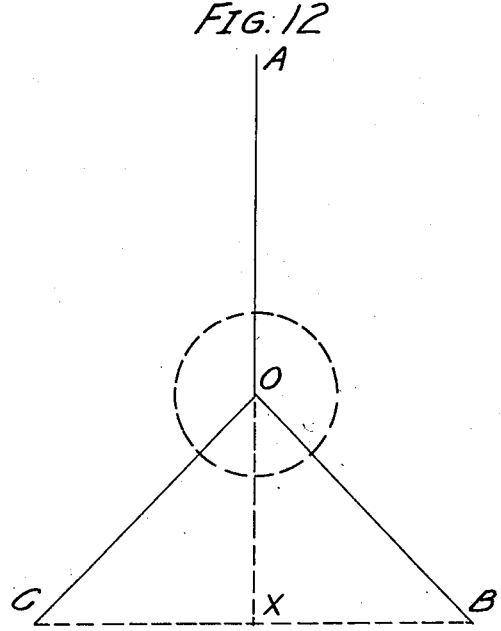

For transformers of unequal size tables would be set up showing the percent of pole circumference to maintain between each centerpoise bracket so that the resultant center of gravity of the combined transformer load would be located at the center of the pole. In setting up these tables it will be necessary to know the eccentricity of the transformer or the horizontal distance of the center of gravity of the transformer from their mounting brackets. This can be obtained from the manufacturer but a quick test in the field can be made. It can be assumed that the center of gravity of the transformer lies in a plane passing through the center lines of its two mounting brackets and the center of the transformer tank. With the transformer sitting on a smooth concrete or wood floor, tilt it so a small round rod can be placed under it at right angles to the center of gravity plane, then roll the transformer on the rod until it balances. Then measure the distance along the floor from the center of the rod to a line projected down from the pole side of the transformers pole mounting brackets thus determining its eccentricity. As an example, to determine the percent of pole circumference to maintain between each centerpoise bracket in a bank of 1–25 kva. and 2–15 kva. transformers refer to Fig. 12. Assume A is the center of gravity of a 875 lb.—25 kva. transformer whose eccentricity is 11.25 inches, with the centerpoise bracket 4 inches and the radius of the pole 5 inches AO=20.25 inches. Assume B and C are the centers of gravity of 2–15 kva. transformers weighing 610 lbs. each and having a 10.5 inch eccentricity then BO and CO=19.5 inches each. The upsetting action on the pole caused by A would be 20.25"×875 lbs. or 17718.75 inch lbs. To counteract this action the other two transformers weighing 610×2 or 1220 lbs. would have to act through a distance OX equal to $$\frac{17718.75}{1220}$$

or 14.52 inches. Therefore angle XOB will be an angle whose cosine $$=\frac{14.52}{20.25}=.717$$

or an angle of 44 degrees and 10 minutes. Angle AOB and angle AOC=180 degrees minus 44 degrees and 10 minutes=135 degrees and 50 minutes. Angle BOC=44 degrees and 10 minutes × 2=88 degrees and 20 minutes. The portion of pole circumference between A and B or between A and C would be $$\frac{135.83}{360}$$

or .3773 times pole circumference of 31.416 inches or 11.85 inches and the portion of pole circumference between B and C would be $$\frac{88.33}{360}=.2454$$

times pole circumference 31.416 inches or 7.71 inches.

Figure 13:
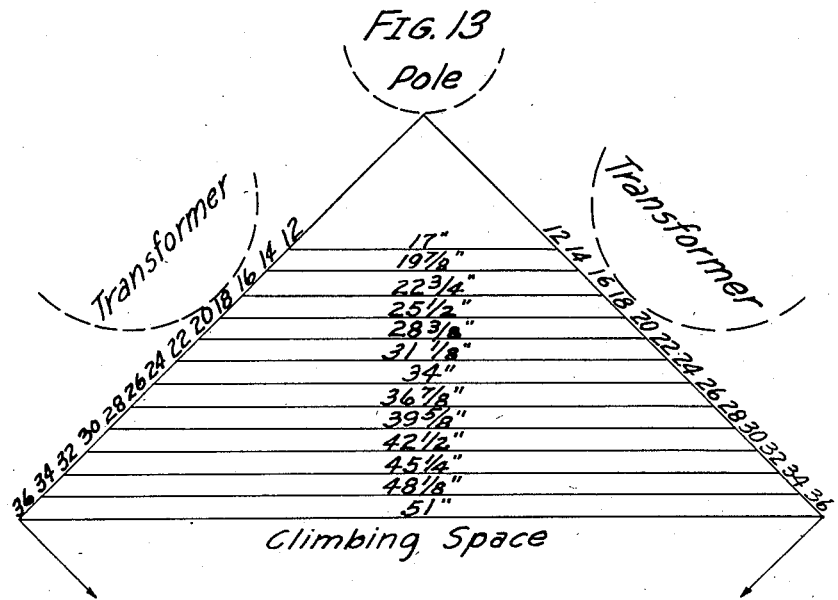

With the three transformers installed on brackets hung in accordance with the above instructions a further check should be made in accordance with Fig. 13 to make sure that sufficient clearance is maintained for climbing space. This climbing space should usually be located between the larger transformer and one of the smaller transformers.

It should also be noted that all transformers should have type A, B or C E. E. I.–NEMA standard support lugs or adapter plates for direct pole mounting.

Figure 7:
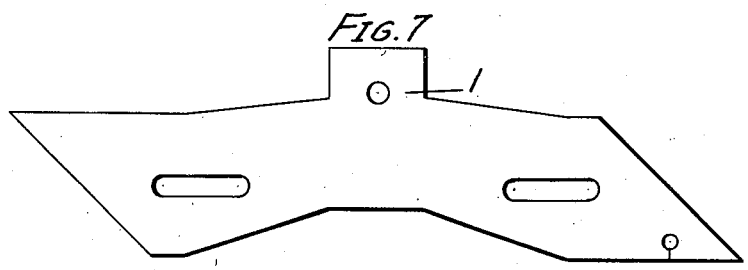

Fig. 7 is the pattern of the centerpoise bracket that would be cut or punched from approximately ¼" ASTM designation A7–36 open hearth steel or similar material before being bent into the shape as shown in Fig. 1. All parts of the centerpoise transformer rack should be hot dip galvanized after fabrication.

Figure 8:
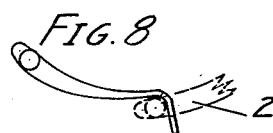
Figure 9:
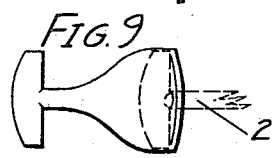

Fig. 8 is the top view and Fig. 9 is the side view of a curved T link. A transformer rack for hanging open delta and open Y transformer banks can be made by using 4 curved T links in addition to 4 centerpoise bracket assemblies. This locates the transformers on opposite sides of the pole from each other.

Figure 10:
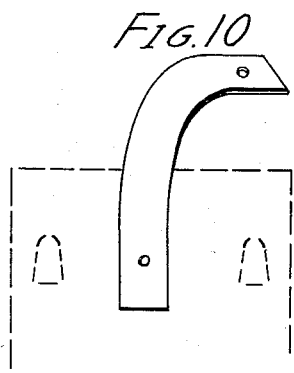
Figure 11:
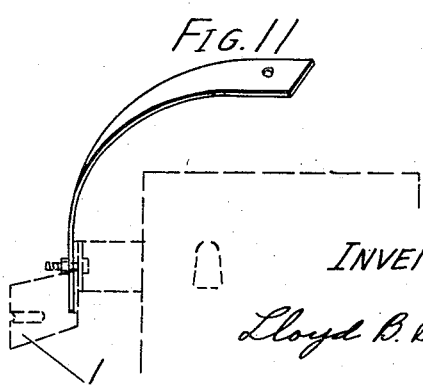

Fig. 10 is the back view and Fig. 11 is the side view of a "boomerang" insulator bracket which when bolted to the inside of a centerpoise bracket can be used to support a short shank steel pin and insulator thus making the centerpoise transformer rack adaptable for use with pocket bushing transformers. Note that this bracket is made the same on each end except for a 45 degree twist in the opposite direction. Thus simply by changing ends of the bracket the insulator can be located over the other bushing of the transformer thus being adaptable for any conceivable bus arrangement that might be required.

The transformers have not been indicated in most of the drawings as they would only tend to make the drawings more confusing. However, the top portion of a transformer is shown in dashed lines on Fig. 11 indicating the method in which they are mounted on the centerpoise transformer bracket.

I am aware that the line material triple-transformer mounting for single phase transformer banks claims that with a three unit bank, each transformer is mounted at an angle of 120 degrees to the other and as a result, the combined weights are equally distributed around the axis of the pole. It can be easily proved however, that the center of gravity of the three transformers are not 120 degrees apart and therefore it does not balance the load, also the smaller the pole and the larger the transformers the more out of balance the load becomes.

Some of the advantages of the centerpoise transformer rack are:

1. The resultant center of gravity of the combined transformer load can be centered more nearly on the center line of the pole than can be obtained with any other transformer rack.

2. No hole boring or pole gaining is necessary.

3. No unwieldy or heavy equipment need be hauled up and installed on the pole.

4. Transformer banks can be installed on smaller lower grade poles than can be used with conventional mounting methods, eliminating the necessity of changing out poles in many instances.

5. Transformers can be mounted above secondaries out of the way of drops, etc., thus eliminating much of the hazard of installing drops at a later date.

6. After the installation has been made it is an easy matter to shift the locations of the two transformers on floating and suspended brackets around the pole one way or the other simply by loosening and tightening the T bolts a little at a time, thus clearing the climbing space or other obstructions.

7. The only tools needed to install the centerpoise transformer rack is a flexible tape, hammer and wrench.

8. Both large and small transformers can be hung on the same rack.

9. By using four curved T links in addition to four centerpoise bracket assemblies a rack for open delta and open Y transformer banks can be made which locate the transformers on exactly opposite sides of the pole.

10. By using the boomerang insulator bracket with any centerpoise transformer rack the rack is adoptable to the use of pocket bushing transformers.

I am aware that prior to my invention pole bands have been made to support any member of objects such as guys, insulators, cross braces, running boards, etc., so I do not claim the invention of a pole band support for transformers in a broad sense but I do claim:

A centerpoise bracket for supporting transformers and the like on a pole, the bracket comprising a plurality of bracket elements, each bracket element being of generally trapezoidal configuration having its base concave to complement the cylindrical surface of a pole and providing rounded corners at each end thereof, the side walls of said bracket elements being slotted, a lag screw extending through the concave base of one of the bracket elements and into the pole, and a plurality of bolts having T-heads and curved threaded shanks, the T-head of each bolt being disposed in a rounded corner of one of the bracket members and the threaded shank thereof extending through the adjacent slot and through both slots of the next adjacent bracket member, a nut on the end of the threaded shank, said plurality of bolts coacting with said plurality of bracket elements and completely surrounding the pole so that tightening the nuts clamps the bracket elements against the pole, and the fourth side of each trapezoidal bracket element comprising a vertically elongated plate having a hole adjacent one end thereof.

References Cited in the file of this patent

UNITED STATES PATENTS

| | | |
|---|---|---|
| 503,216 | Peterson | Aug. 15, 1893 |
| 532,748 | Ball | Jan. 22, 1895 |
| 740,005 | Gilliland | Sept. 29, 1903 |
| 1,397,843 | Rapp | Nov. 22, 1921 |
| 1,770,564 | Zahonyi | July 15, 1930 |
| 1,864,651 | Hawley | June 28, 1932 |
| 1,992,322 | Nulf | Feb. 26, 1935 |
| 2,270,375 | King | Jan. 20, 1942 |
| 2,628,805 | Smalley | Feb. 17, 1953 |

FOREIGN PATENTS

| | | |
|---|---|---|
| 368,561 | Great Britain | Mar. 10, 1932 |
| 376,969 | Germany | June 8, 1923 |